Jan. 24, 1933.  J. T. FERGUSON  1,895,031
COTTON PICKER
Filed July 28, 1930  4 Sheets-Sheet 4
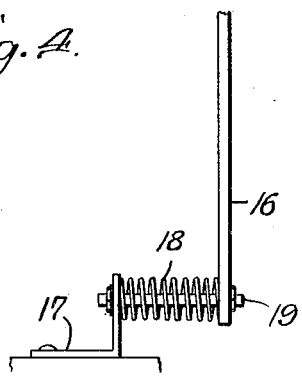
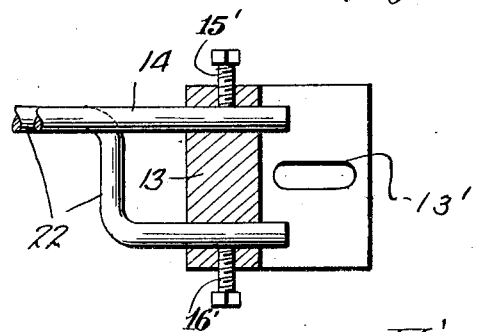
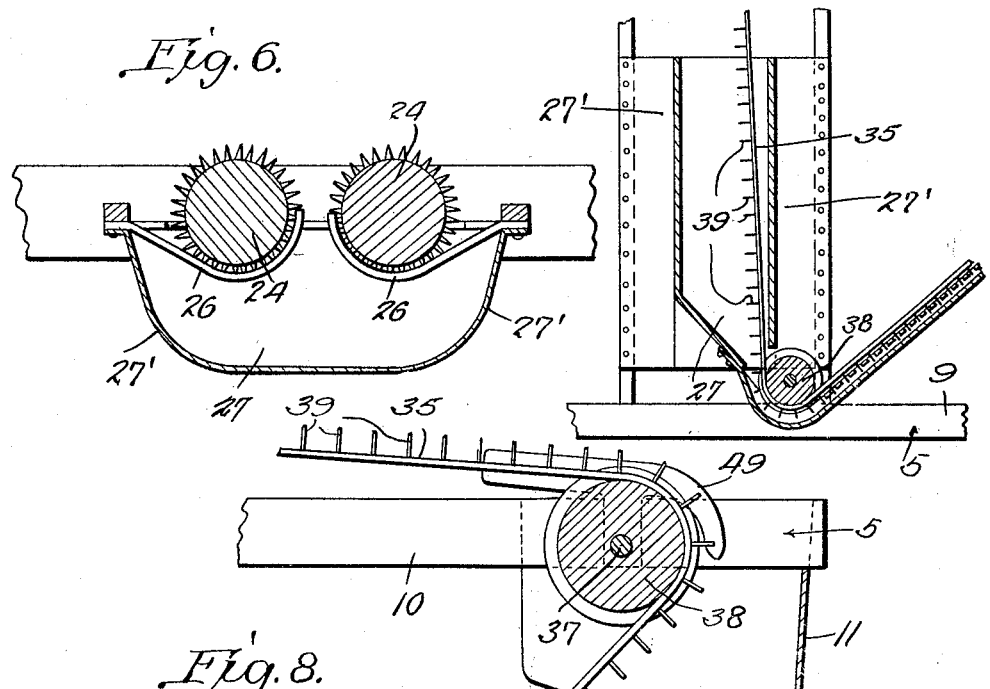
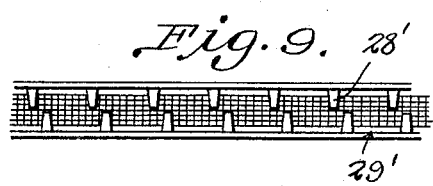
Inventor
J. T. Ferguson
By C. A. Snow & Co.
Attorneys.

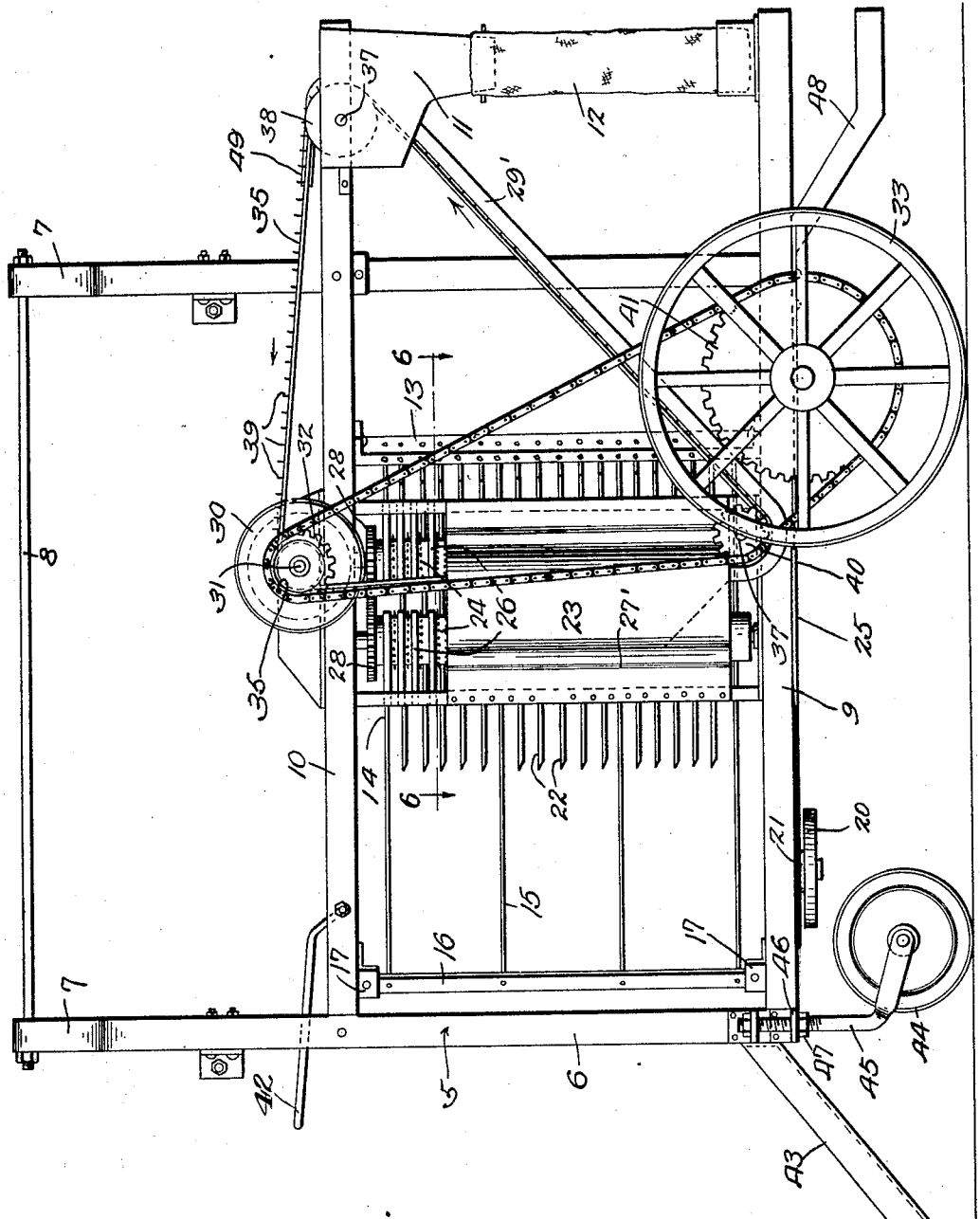

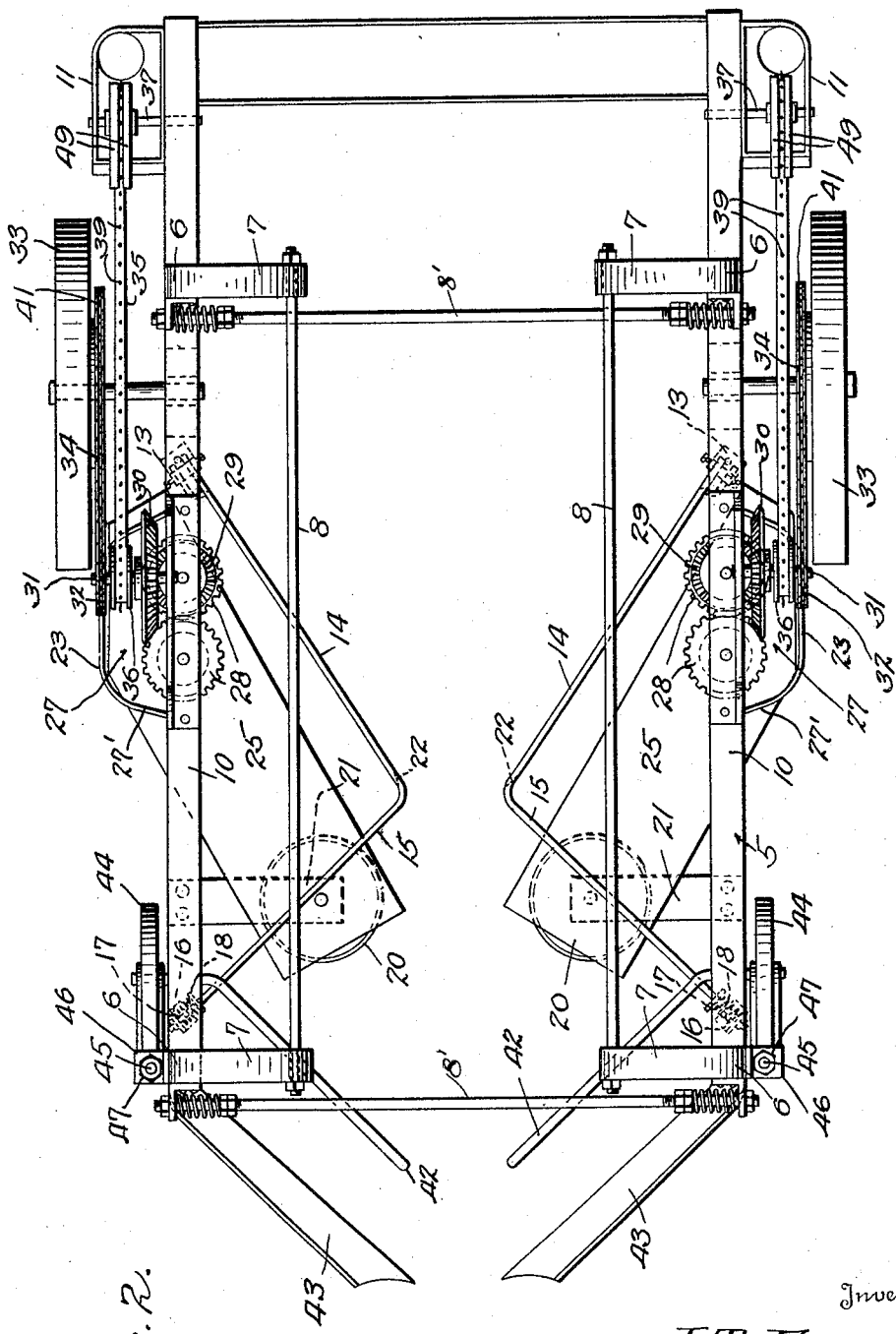

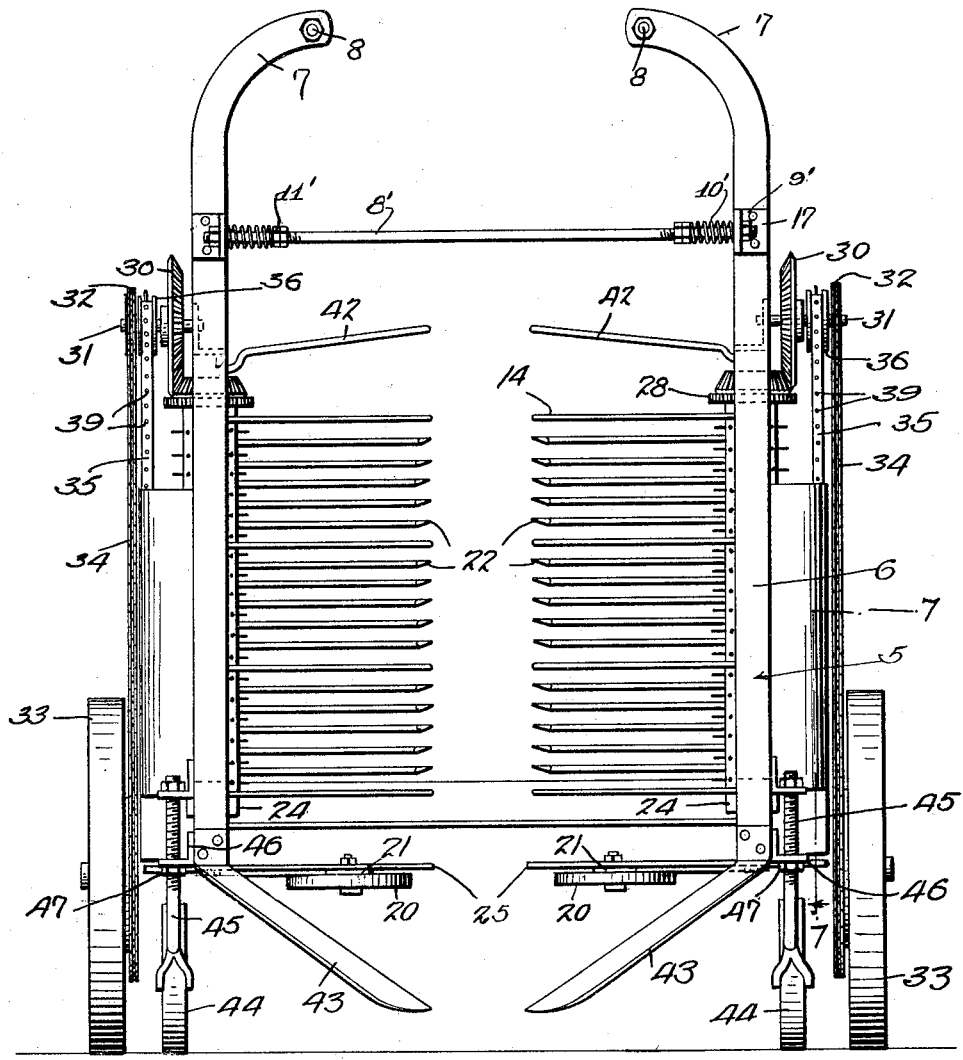

Patented Jan. 24, 1933

1,895,031

UNITED STATES PATENT OFFICE

JESSE T. FERGUSON, OF MERIDIAN, MISSISSIPPI

COTTON PICKER

Application filed July 28, 1930. Serial No. 471,278.

This invention relates to cotton picking machines, the primary object of the invention being to provide a machine that will efficiently remove cotton from the burs or stalks of cotton plants.

An important object of the invention is to provide a machine of this character so constructed that it may be moved along a row of cotton, means being provided for engaging the cotton and stripping the cotton from the plants.

Another object of the invention is to provide endless conveyors operating adjacent to the picking rolls for carrying the cotton to the rear of the machine where it is deposited in sacks for collection.

A still further object of the invention is to provide fingers of a novel construction and mounted in such a way that they will direct the cotton material to the picking rolls of the machine.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a cotton picking machine constructed in accordance with the invention.

Figure 2 is a plan view of the cotton picking machine.

Figure 3 is a front elevational view thereof.

Figure 4 is a fragmental detail view illustrating the resilient supporting means for the guiding rods of the machine.

Figure 5 is a detail view illustrating the manner of securing the guide rods and picking fingers to the machine.

Figure 6 is a sectional view taken on line 6—6 of Figure 1.

Figure 7 is a vertical sectional view taken on line 7—7 of Figure 3.

Figure 8 is a fragmental sectional view through the filling spout of the machine.

Figure 9 is a fragmental plan view of the elevating runway and flexible cleaning strips attached thereto.

Referring to the drawings in detail, the device comprises a frame indicated generally by the reference character 5, the frame comprising end posts 6 that have their upper ends curved inwardly as at 7, the front and rear posts 6 at each side of the frame being connected by rods 8. These rods 8 act to brace the upper portion of the frame and at the same time confine the branches of the plants to the central portion of the machine. At the ends of the frame of the machine, are rods 8′ that pass through openings in the angle plates 9′, there being provided coiled springs 10′ on the rods 8′ to normally urge the sides of the frame laterally. Nuts 11′ are mounted on the rods and act to tension the springs 10′. The frame also includes lower side bars 9 and upper side bars 10, which are connected to the posts 6, in any well known manner. As shown, the bars 9 and 10 extend appreciable distances beyond the rear corner posts 6, where they provide supports for the funnel-shaped members 11, which discharge material into the sacks 12 that are positioned over the lower ends of the funnels.

The reference character 13 designates bars or brackets, which are formed with right angled end members having elongated openings 13′ to receive securing bolts whereby the bars may be adjusted, to adjust the rods supported thereby. Rods 14 extend into openings of the bars 13, and are secured in position by means of the set screws 15′. These rods extend to points adjacent to the central portion of the frame of the machine, the forward ends of the rods 14 being extended at right angles as at 15, from where they pass into the bars 16 that in turn have their ends disposed adjacent to the brackets 17. The brackets 17 are formed with openings to receive the coiled springs 18 that are mounted on the bolts 19 in such a way as to cushion the movements of the rods 14 should severe strain be directed to the rods, caused by the plants being pulled through the rods 14. These rods 14 are arranged at opposite sides of the machine to engage opposite sides of the row, exerting pressure of springs 18 towards each other to the trunk portions of the cotton stalks at their points of bend, the rods being properly spaced above wheels 20 to ply horizontally between the limbs or branches, holding the trunk portions between their pressure.

The front angle of these rods guides the trunk parts of the plants inwardly, while the rear angles assist fingers 22 in guiding the limbs and bolls of cotton outwardly.

Operating in horizontal planes, and disposed under the frame of the machine, are wheels 20 that are mounted on the arms 21 extending inwardly from the frame, directly under the rods 14. These wheels 20 operate below the limbs or branches on the trunk part of the cotton stalks, and act to press the cotton stalks in line on the row, which materially assists the work of rods 14.

Disposed between rods 14, at opposite sides of the machine, are fingers 22, that have their forward ends pointed. These fingers are rigidly secured to the rod frames of bars 13, and are held in parallel spaced relation with the rods 14, regardless of the action of the springs 18 by means of the set screws 16', the rods at opposite sides of the frame extending towards the center of the frame of the machine, where they are spaced apart so that the plants are guided to a narrow portion at the center of the machine.

The pointed extremities of fingers 22 are so arranged with respect to the rods 14 as to cause them to barely miss the perpendicular trunks of the cotton stalks over which the machine is being moved, causing the limbs and stems on which the bolls of cotton are growing, to extend between the fingers, and as the machine moves forwardly along a row of cotton, these fingers cause the cotton bolls to slide outwardly to the picking rolls 24. The bolls being too large to pass between the fingers, the stems pull on the bolls through the fingers, moving the bolls into contact with the picking rolls 24.

The cotton is detached by the picking rolls and carried by the picking rolls into a receiving chamber, to be hereinafter more fully described. The burs and limbs pass rearwardly on the guide fingers and are released.

As shown by Figure 5 of the drawings, every other rod or finger 22 is formed with an offset inner end portion so that openings are formed to permit the burs and limbs of the cotton plants, to pass therethrough.

Arranged adjacent to the rear ends of rods 14 and fingers 22, are vertical housings 23 in which the picking rolls 24 are mounted, the picking rolls being provided with outwardly extended teeth to pick the cotton from the burs or stalks. The picking rolls 24 are mounted on vertical shafts on which rows of teeth are provided, the teeth being spaced apart to permit them to operate with facility. These picking rolls operate in pairs, and are geared to rotate in opposite directions, feeding the material with which they contact, inwardly. These rolls 24 operate near the bases of the fingers, and when the fingers are properly adjusted to the rolls, the rolls will move the cotton inwardly into the chambers 27, where the cotton is freed from the teeth by the strippers 26, that operate between the teeth. As the cotton is removed from the teeth, the cotton falls downwardly into chamber 27 formed by the vertical plates 27'.

Directly over the wheels 20, are plates 25 which extend to points directly under the picking rolls, which plates act to catch the cotton that may drop from the plates as the machine passes thereover. The cotton dropping onto the plates 25 is brushed onto the picking rolls 24 by the cotton plants over which the machine is moving, the cotton being carried rearwardly and deposited in the sack supported by the machine.

As clearly shown by the drawings, gears 28 are provided at the upper ends of the picking rolls, there being provided beveled pinions 29 at the upper ends of certain of the picking rolls, that are engaged by the pinions 30 mounted on the shafts 31.

Sprockets 32 are mounted on the shafts 31 and receive rotary motion from the wheels 33, through the chains 34, whereby rotary motion is imparted to the pinions 30 to rotate the picking rolls, in a manner as described.

Endless belts 35 operate over pulleys 36 mounted on shafts 31, from where they pass downward through chambers 27 over idler pulleys 40, and on up the incline over pulleys 38, which are mounted adjacent to the upper ends of funnel-shaped receivers 11. Pointed pins 39 extend from the belts to pierce the cotton locks and drag them up incline runways to receivers 11. Strippers 49 are attached adjacent to pulleys 38 to force the cotton from pins into receivers.

The belt runways 29' which extend from the bottom of chambers 27 to top of receivers 11, may be constructed of wire or metal with very shallow sidewalls, and properly spaced along these sidewalls are flexible strips 28', to brush off any foreign substance as the cotton moves up the incline elevation.

Mounted on the shafts 31 are sprockets 32 that receive rotary motion by the action of chain 34 that operates over the sprockets 41 which are secured to wheels 33 that support the rear end of the machine.

Thus it will be obvious that due to this construction, the trunk part of the cotton stalks will be held inwardly by rods 14 until fingers 22 engage the limbs and bolls of cotton and direct their course outwardly to the picking rolls, picking rolls taking cotton on into chambers 27, and thence carried by the endless belts on up the incline to the cotton sacks.

Secured to the frame at points above the rods 14, are inwardly extending rods 42 that act to hold the plant limbs downward to bring them into engagement with the guide fingers. At the lower end of the machine are inwardly extending blades 43, the free ends of the blades being spaced apart to permit the trunk part of the plants to pass therebetween, the blades being slightly tilted to cause branches near the ground of the cotton stalks, to be pushed upwardly to be carried into the picking rolls by the guide fingers, as the machine moves along the ground surface.

Wheels 44 are mounted at the forward end of the machine, the wheels being supported on the vertical shafts 45 that are swiveled in the bearings 46, there being provided nuts 47 whereby the machine may be adjusted on the shafts, to raise and lower the machine with respect to the ground surface.

At the rear of the machine are rearwardly extended arms 48 that press on the sides of the cotton stalks, to steady the machine and hold the machine against lateral movement, by its contact with the plant.

I claim:

1. In a cotton picking machine, a frame, a plurality of picking fingers mounted within the frame, guide rods for guiding material to the picking fingers, wheels operating in horizontal planes, disposed under the picking fingers to elevate the cotton plants over which the machine is moving, and means for removing material from the picking fingers.

2. In a cotton picking machine, a frame, a plurality of picking fingers mounted within the frame, means for guiding material to the picking fingers, rotary members operating under the picking fingers elevating the cotton plants over which the machine is moved, and means for removing material from the picking fingers.

3. In a cotton picking machine, a frame, a plurality of picking fingers mounted within the frame, a plurality of rods arranged in vertical spaced relation to each other, yieldable means for cushioning the movements of the rods, and means for guiding material to the picking fingers.

4. In a cotton picking machine, vertical rows of picking fingers, a frame, vertical rows of rods, the ends of the rods being connected with the frame, the rods extending inwardly from opposite sides of the frame and defining a restricted passageway, and means for removing material from the rods.

5. In a cotton picking machine, a frame, vertical rows of picking fingers extending rearwardly from the frame and providing a restricted passageway through which plants pass, rods disposed between certain of the fingers and having inwardly and rearwardly extended portions to guide plants to the picking fingers, and picking rolls for removing cotton from the plants.

6. In a cotton picking machine, a frame, rows of picking fingers secured to the frame and extending inwardly from the frame, guide rods arranged between certain of the picking fingers for guiding material to the picking fingers and rotary picking members for removing cotton from the plants, as the plants are held between the rods and picking fingers.

In testimony that I claim the foregoing as my own, I have hereto affixed my signature.

JESSE T. FERGUSON.